FIG. 4

INVENTORS
ROBERT E. DILKS, BILL E. CORRONS,
JOHN A. IHM, ROBERT G. CURTIS
BY
ATTORNEY
AGENT

FIG. 5

INVENTORS
ROBERT E. DILKS, BILL E. CORRONS,
JOHN A. IHM, ROBERT G. CURTIS
BY
ATTORNEY
AGENT

United States Patent Office 3,171,124
Patented Feb. 23, 1965

3,171,124
RADAR PERFORMANCE MONITOR
Robert E. Dilks, Claremont, Bill E. Corrons, Montclair, and John A. Ihm, Claremont, Calif., and Robert G. Curtis, Scottsdale, Ariz., assignors to General Dynamics Corporation, San Diego, Calif., a corporation of Delaware
Filed June 1, 1960, Ser. No. 33,313
12 Claims. (Cl. 343—17.7)

This invention relates generally to apparatus for monitoring the performance of radar systems, and more particularly to apparatus which continuously evaluates the maximum detection range capabilities of radar systems and provides information which can be visually displayed to provide immediate recognition of detection range degradation during operational use.

Recognition of detection range degradation of radar systems has been a serious problem universally encountered in radar field operations. Deterioration of detection range by 50% or more from the maximum attainable range has been a common occurrence. As is well known, the detection range of a radar system is largely dependent upon the energy content of the transmitted pulses, and the sensitivity of the receiver. Accordingly, it is readily apparent that a decrease in any one of these factors from maximum attainable values decreases the maximum attainable detection range of the radar system. Thus, a decrease in power level of the transmitted pulses due to malfunction of the transmitter results in serious range degradation. Also, since the maximum sensitivity of the receiver is determined by an optimum signal-to-noise ratio, a reduction in gain of the receiver due to malfunction, or an increase in the noise level from a normal level due to enemy jamming or interference by friendly radar systems operating in the immediate vicinity, each contribute to range degradation.

Until the present invention there has been no known method or apparatus which would provide the radar system operator with continuous visual information as to the maximum detection range capability of the radar system under the immediate operating conditions. The heretofore existing procedures, which involved periodic radar system check-outs of transmitter and receiver components to determine whether they operated properly, were complex and time consuming, resulting in substantial periods of radar system "down time." Moreover, even after such check-outs were made, detection range degradation due to component malfunction occurring thereafter frequently went undiscovered until the succeeding routine check-out was made. Also, in these procedures there was no way of determining detection range degradation due to interference by friendly or enemy sources while the radar system was in operation under actual field conditions.

The radar performance monitor of the present invention provides means for generating a calibrated signal simulating echoes which would be reflected from an object of predetermined size and located at the maximum attainable detection range of the radar system when the transmitter is generating pulses having maximum attainable energy, and the receiver gain is established at such a level by positioning the usual manual volume control so as to obtain an optimum signal-to-noise ratio for maximum sensitivity.

The calibrated signal thus generated is adapted to be inserted into the input of the radar receiver while the radar system under test is in operation, the manual volume control of the receiver being set to the same position, hereinbefore referred to, which was found to provide maximum sensitivity.

Further provision is made in the form of a maximum actual range capability evaluator device which recognizes any change in the amplitude of the calibrated signal appearing in the output of the receiver due to a change in gain of the receiver because of receiver malfunction. In addition, the evaluator recognizes noise level changes in the output of the receiver above a predetermined level due to enemy jamming or other interference, and also senses changes in the radar transmitter power output level below a predetermined level. The changes in noise and power are utilized to vary the amplitude of the calibrated signal found in the output of the receiver to reflect these changes and accordingly to provide a measure of the maximum actual range capability of the radar system. The evaluator varies the calibrated signal amplitude directly as the transmitted output power level changes below a predetermined level. That is, when the power level decreases below the predetermined level the amplitude of the signal is decreased and when the power level increases below the predetermined level the signal amplitude is increased. On the other hand, when the receiver output noise level changes above the predetermined level, the amplitude of the calibrated signal is inversely varied. That is, when the noise level increases above the predetermined level, the amplitude of the calibrated signal is proportionately decreased, and when the noise level decreases, the calibrated signal amplitude is increased.

A display signal generating circuit is also provided which utilizes the changes in the amplitude of the calibrated signal to produce a display signal on the radar indicator in the form of a visual ring which represents the maximum actual range capability of the radar system under operating conditions. Thus, the radar performance monitor of the present invention is capable of providing the radar system operator with a means for determining at a glance the maximum operating detection range capability of the radar system which continuously reflects detection range degradation due to enemy jamming, interference by closely situated friendly detection systems, transmitted power output level deterioration, receiver gain deterioration, and malfunction of components constituting the radar system.

Accordingly, it is an object of the present invention to provide apparatus for monitoring the performance of a radar system during operational use.

Another object is to provide a radar performance monitor for a radar system which continuously evaluates the maximum actual range capability of the system taking in consideration such factors as receiver gain, transmitter power, and noise level in the receiver output while the system operates.

Still another object is to provide a radar performance monitor for a radar system which incorporates apparatus capable of evaluating the maximum actual range capability of the system, and supplying continuous display information of the maximum actual range capability while the system operates.

Further objects will become apparent from the following description taken in conjunction with the drawings, of which.

Figure 1:
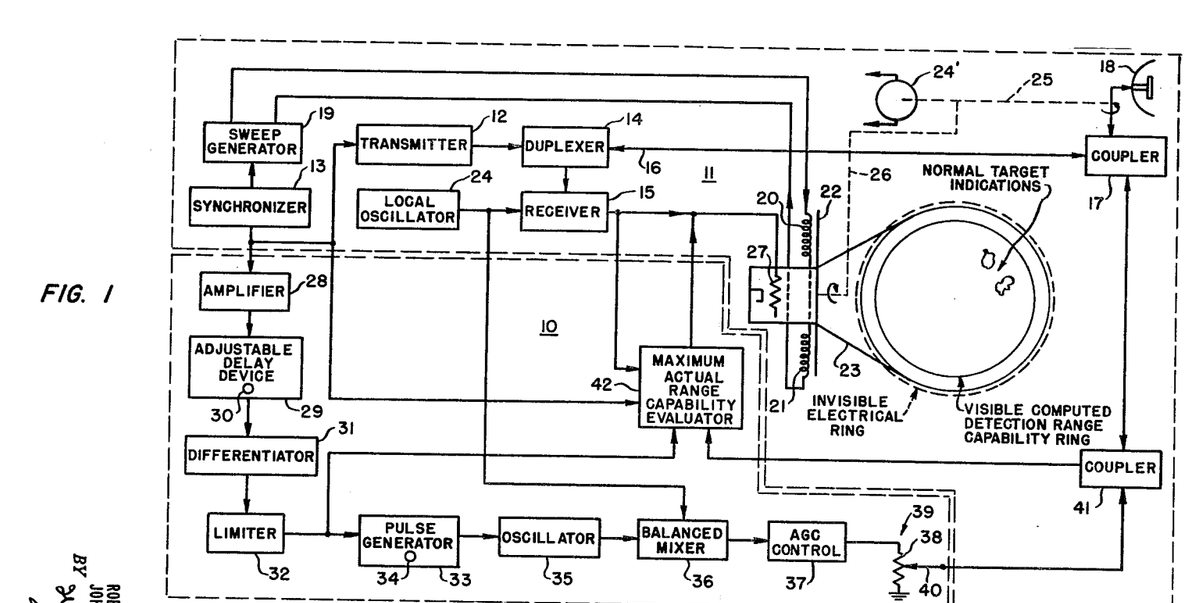
FIG. 1 is a block diagram, partly in schematic, showing the radar performance monitor of the present invention as adapted for use with a conventional radar system.
Figure 2:
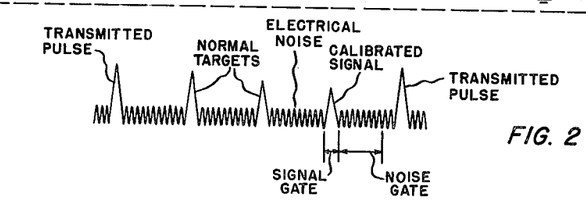
FIG. 2 is a showing for illustrative purposes of the inserted calibrated signal as it would appear on an "A" scan type of indicator, and as related to other signals.

Referring now more in detail to the drawings, and in particular to FIG. 1, wherein there is disclosed the radar performance monitor 10 of the present invention, as adapted for use with a conventional radar system 11. The numeral 12 represents a transmitter of radio frequency energy for providing a series of regularly recurrent pulses at a repetition rate determined by the series of positive trigger pulses produced by the synchronizer 13. The output of the transmitter 12 is supplied through a duplexer 14, which protects the system receiver 15 from undue shock during periods when the transmitter is functioning, and along a suitable transmission line 16 to a directional coupler 17, and then to a highly directional antenna array 18 which radiates the radio frequency energy. Duplexers and directional couplers are well known and, since they are not per se a part of the present invention, need not be described in detail. The transmisison line 16 serves as a common path for the radio frequency energy produced by the transmitter 12 and the reflected energy from objects which intercept the transmitter energy, the reflected energy being detected by the antenna array 18 and conveyed through the transmission line 16 to the duplexer 14 and then to the receiver 15. The antenna array 18 is rotatably mounted so as to enable the region surrounding the radar system to be scanned with pulses of radio frequency energy produced by the transmitter 12.

Simultaneously with the triggering of the transmitter 12, the synchronizer 13 actuates the sweep generator 19 to produce sawtooth output signals which are applied to a pair of series connected deflecting coils 20 and 21 wound around a yoke 22, which is rotatably mounted about the neck of a cathode ray tube 23. The directional antenna array 18 is continuously rotated by a motor 24', which also drives the yoke 22, as indicated by broken lines 25 and 26, whereby the rotation of the deflecting coils 20 and 21 is synchronized with the rotation of the antenna array 18. The sweep generator 19, coils 20 and 21, and tube 23 constitute components of a plan position indicating oscilloscope, the electron beam of which is, by means of the arrangement described, deflected radially outward from its normal axis in synchronism with the pulse transmission of the system, while the resulting radial sweep is rotated about the normal axis in synchronism with the rotation of antenna array 18.

Upon encountering reflecting objects in space, portions of the energy radiated by the antenna array 18 are reflected, and the resulting echo pulses are received by the antenna array 18 and applied, through coupler 17 and duplexer 14 to the usual mixer of receiver 15, to which is also supplied a heterodyning or beating frequency signal from a local oscillator 24, as in standard superheterodyne receivers. After detection in the receiver, the echo pulses are applied to the control grid 27 of the cathode ray tube 23 to intensity modulate the electron beam in the usual manner to produce light spots or normal target indications, as shown, at points corresponding to the azimuthal bearing and ranges of the objects causing the reflections of transmitted energy.

Simultaneously with the provision of trigger pulses to the transmitter 12 and the sweep generator 19, the synchronizer 13 also provides trigger pulses to the input of an amplifier 28 whose pulse output is of negative polarity for triggering an adjustable delay device 29. The delay device 29 can be a phantastron circuit containing an adjustable timing circuit, not shown, which can be adjusted by means of knob 30 to provide negative delay pulses of desired duration. In the monitor of the present invention the knob 30 is adjusted to provide the negative delay pulses with leading edges time coincident with the leading edges of the synchronizing trigger pulses produced by the synchronizer 13, and trailing edges time coincident with the leading edges of echo pulses which would be reflected by an object located at the maximum attainable range of the radar system 11.

The negative delay pulses generated by the delay device 29 are supplied to a differentiator 31 for providing an output having two pulses of negative and positive polarity at the leading and trailing edges respectively, of each negative delay pulse generated by the delay device 29. Since the trailing edge of each pulse generated by the delay device 29 can be changed at will by adjustment of knob 30, it is readily apparent that the timing of each positive pulse which is time coincident with the trailing edge of each delay pulse from the delay device is also controllable by the adjustment of knob 30.

The negative and positive pulses from differentiator 31 are next fed to a limiter 32 which removes the negative pulses and applies the positive pulses to the input of a pulse generator 33 which can be another delay pulse producing device such as a phantastron circuit. The pulse generator 33 is adapted to be triggered by the positive pulses from the limiter 32 and contains an adjustable timing circuit, not shown, which can be adjusted by means of knob 34 to provide positive delay pulses of desired duration. In the present invention the knob 34 is so adjusted as to provide positive delay pulses whose leading edges coincide in time with the leading edges of the positive pulses from the limiter 32 and of such duration as to have trailing edges time coincident with the trailing edges of the hereinbefore mentioned echo pulses which would be reflected by an object located at the maximum attainable range of the radar system 11.

The positive pulses from the generator 33 are supplied to energize the oscillator 35 which is adapted to oscillate at the intermediate frequency of the radar system, and produces pulses containing intermediate frequency energy. The intermediate frequency energy contained in the pulses from oscillator 35 is then mixed with a portion of the energy from local oscillator 24 in the mixer 36. As a result of the mixing of the two frequencies the high energy output pulses have energy of the same frequency as the energy of the transmitted pulses produced by the transmitter 12.

An automatic gain control circuit 37 maintains the amplitude of the high energy delayed pulses from the mixer 36 at a substantially constant level. Such automatic gain control circuits are well known in the art and are not believed to require specific description herein. The high energy delayed pulses from the automatic gain control circuit are applied across the resistor portion 38 of a potentiometer 39 whose output is taken between a movable arm portion 40 and ground. The potentiometer is utilized to selectively adjust the amplitude of the high energy delayed pulses to produce regulated pulses which simulate echo pulses reflected by the hereinbefore mentioned object having a predetermined size and located at the maximum attainable range of the radar system.

It is apparent from the foregoing that the radar performance monitor of the present invention produces pulses containing radio frequency energy having the same frequency as the energy contained in the pulses transmitted by the transmitter of the radar system to be monitored. The pulses are so delayed in time as to simulate echoes which would be reflected by an object located at the maximum attainable detection range of the radar system, and are amplitude calibrated to further simulate echoes reflected from the object having a predetermined size and located at the maximum attainable range of the system.

The calibrated or regulated pulses picked off by the movable arm 40 of the potentiometer 39 are led by way of suitable transmission lines through directional coupler 41 and 17 to the duplexer 14 and then to the receiver 15. The detected regulated pulses found in the output of receiver 15 directly actuate the control grid 27 of the cathode ray tube 23 to produce an invisible electrical ring located just outside the perimeter of the cathode ray tube screen, as shown. Simultaneously with the actuation of the grid 27 the regulated pulses are also fed to a maximum actual range capability evaluator 42 which senses changes in amplitude of the regulated pulses due to any changes in gain of the receiver 15 from the hereinbefore mentioned predetermined setting. The evaluator 42 also senses changes in the noise signal level in the output of the receiver 15 above a predetermined level, and the power output level of the transmitter 12 below a predetermined level, and varies the amplitude of the regulated pulses to reflect these changes, as will hereinafter be more fully described, to produce varied regulated pulses which are a measure of the maximum actual range capability of the radar system. The evaluator 42 also includes a display system, to be hereinafter more fully described, which utilizes the amplitude modified regulated pulses to produce display signals adapted to actuate the grid 27 of the cathode ray tube 23 to produce a continuous visual display thereon representing the maximum actual range of the system while the system is operating.

Figure 3:
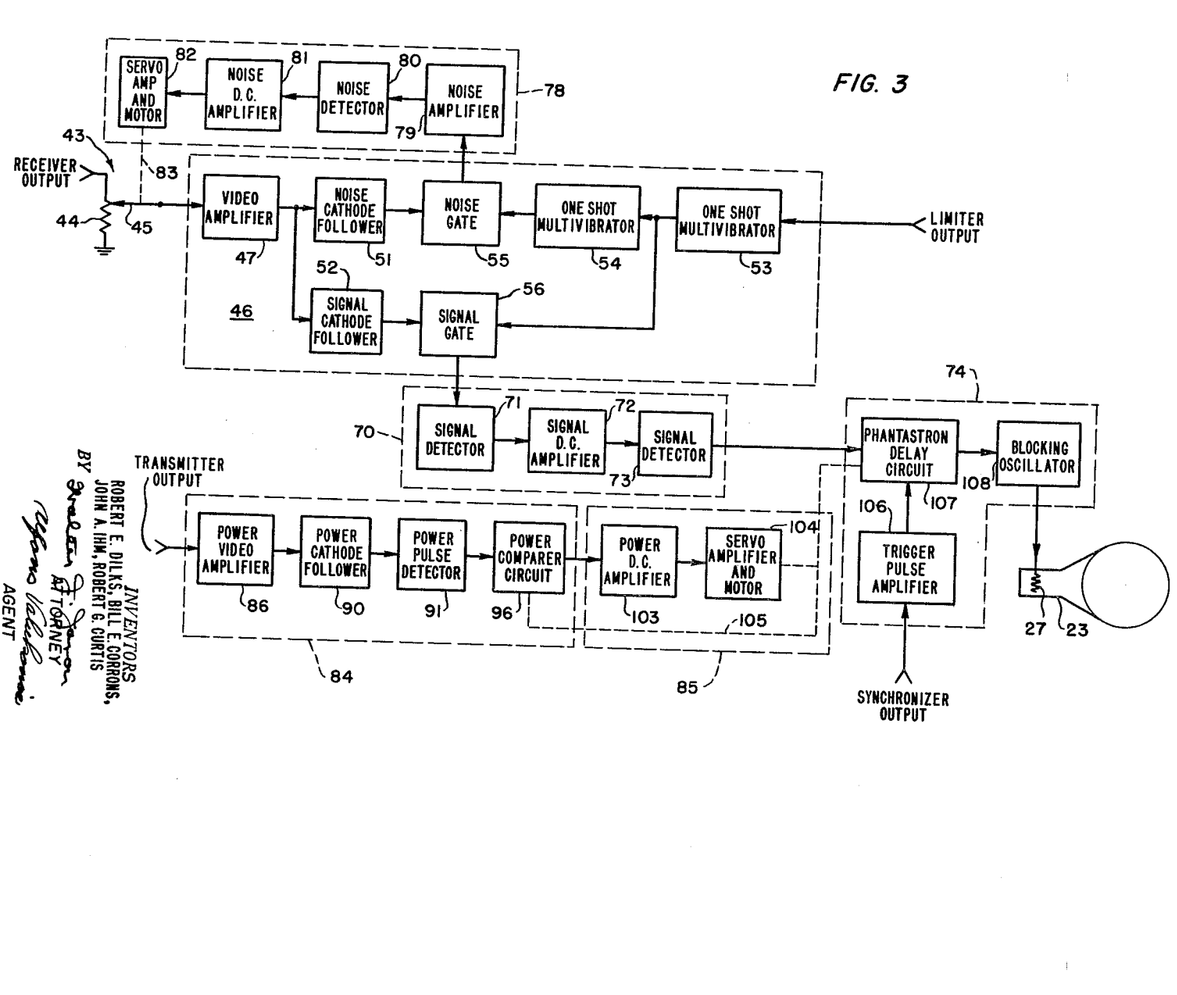
FIG. 3 is a block diagram, partly in schematic, showing the evaluator component of the radar performance monitor of FIG. 1 as related to other components.

Referring to FIG. 3, wherein there is revealed the details of the maximum actual range capability evaluator 42 of the radar performance monitor 10 of the present invention in block diagram, the numeral 43 designates a variable gain control device or potentiometer having a resistor portion 44 across which the output of receiver 15 is adapted to be applied, and a movable arm portion 45 electrically connected to a signal sampling circuit 46. It is readily apparent that any changes in the amplitude of the regulated pulses found in the output of receiver 15 due to changes in gain of the receiver from the predetermined optimum level hereinbefore mentioned will be reflected across the resistor portion 44.

Figure 4:
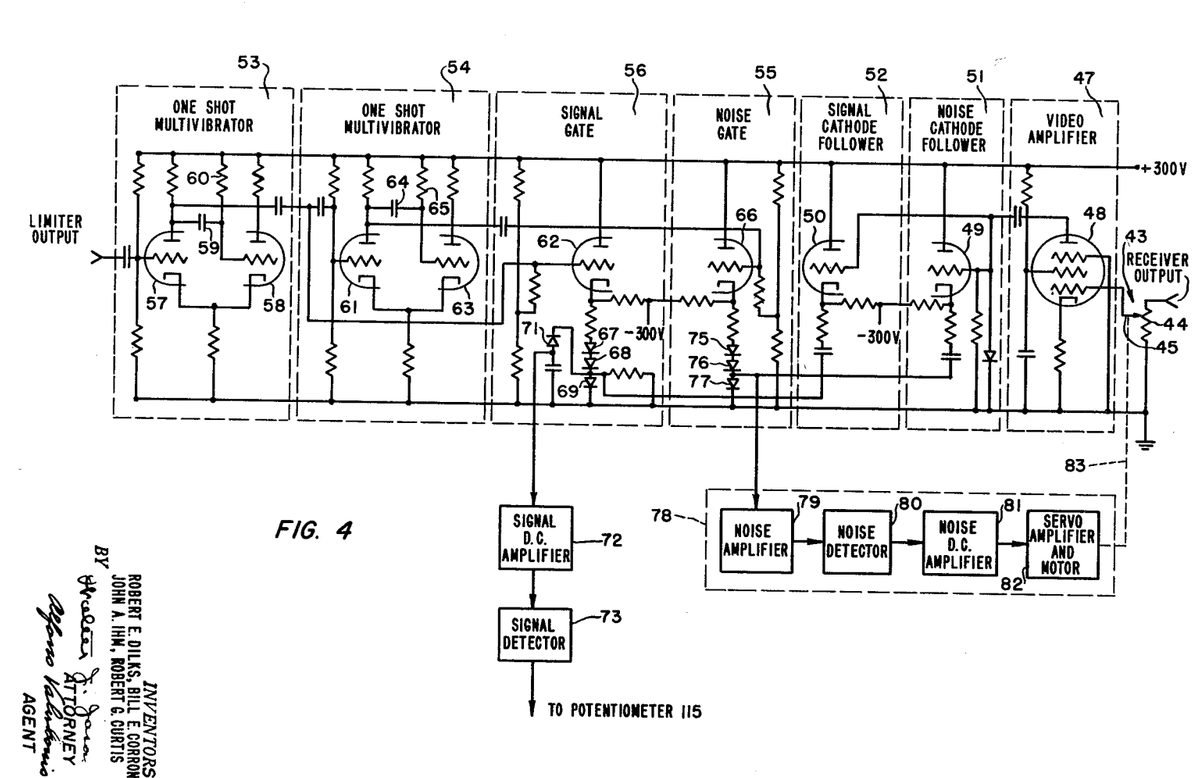
FIG. 4 is a schematic showing, partly in block diagram form, of certain components of the evaluator of FIG. 3.

The signal sampling circuit 46, as revealed in FIGS. 3 and 4, consists of a video amplifier 47 whose tube 48 has its grid electrically connected to the movable arm 45 of potentiometer 43 to thus provide at its plate an amplified portion of the receiver output applied across the resistor portion 44 and picked off by the movable arm 45.

The amplified output found at the plate of tube 48 is simultaneously applied to the grids of tubes 49 and 50 of the noise cathode follower 51 and signal cathode follower 52, which serve to reduce the driving impedances to gating circuitry, to be hereinafter more fully described, and as isolators between signal and noise gate detectors contained in the above referred to gating circuitry.

The gating circuitry, which consists of one-shot multivibrators 53 and 54, noise gate 55, and signal gate 56, is provided for the purpose of sampling both the noise signal and the hereinbefore referred to regulated pulses found in the output of receiver 15. Sampling is accomplished by applying the positive delayed pulses produced by the limiter 32 to the grid of tube 57 of the multivibrator 53. In the steady state condition of the multivibrator, tube 57 is cut off and tube 58 conducts, but with the application of a positive delayed pulse from the limiter 32, tube 57 conducts and tube 58 cuts off. This momentary state of equilibrium is maintained until the capacitor 59 discharges sufficiently to increase the grid voltage of tube 58 above cut-off. The multivibrator 53 then returns to the original steady state condition and awaits the next positive delayed pulse whereupon the cycle is repeated. The durations of the first gating pulses thus produced at the plate of tube 58 are determined by the time constant of the circuit arrangement consisting of the capacitor 59 and resistor 60, which has such a value as to provide gating pulses having durations equal to the durations of the regulated pulses hereinbefore mentioned.

The first gating pulses produced by the multivibrator 53 are simultaneously applied to the grid of tube 61 of the one-shot multivibrator 54 and the grid of tube 62 of the signal gate 56. The multivibrator 54 operates in a manner comparable to the multivibrator 53 in that tube 63 is normally conducting and tube 61 is cut off. The trailing edges of the first gating pulses trigger the tube 61 to render it conducting to produce second gating pulses having durations dictated by the time constant of the circuit consisting of capacitor 64 and resistor 65. The time constant has such a value as to produce second gating pulses whose leading edges are time coincident with the trailing edges of the first gating pulses and trailing edges delayed in time with respect to the leading edges of the transmitted pulses generated by the transmitter 12. The second gating pulses are applied to the grid of tube 66 of the noise gate 55 which provides a means for sampling the noise signal in the output of receiver 15, as will hereinafter be more fully described.

The signal gate 56 samples the regulated pulses found in the output of receiver 15. During the period between first gating pulses the grid of tube 62 in the signal gate 56 is biased positively, causing its cathode to be positive. This condition allows the diodes 67, 68 and 69, which are connected in series with the cathode of tube 62, to conduct to ground, thus shorting the input to a detector and amplifier circuit 70 which consists of signal detector 71, signal D.C. amplifier 72, and signal detector 73. When negative first gating pulses appear at the grid of tube 62 its cathode becomes negative and the series connected diodes 67, 68 and 69 are cut off. This action then opens the short across the input to the circuit 70 allowing the regulated pulses to pass to signal detector 71 wherein they are rectified to provide a D.C. voltage average of the peak amplitudes of the regulated pulses. The signal D.C. amplifier 72 amplifies the weak D.C. voltage from the detector 71 to a usable level and applies it to another signal detector 73 for further rectification. The D.C. voltage found in the output of detector 73 is applied to a display circuit 74, to be hereinafter more fully described.

The noise gate 55, which operates in a manner comparable to signal gate 56, samples the noise signal found in the output of receiver 15. During the period between second gating pulses provided by the multivibrator 54, the grid of tube 66 is biased positively, causing its cathode to be positive. With this condition present, diodes 75, 76 and 77, which are connected in series arrangement, conduct to ground, thus shorting the input to the noise detection and leveling circuit 78. When negative second gating pulses appear at the grid of tube 66, its cathode becomes negative and the series connected diodes 75, 76, and 77 are cut off. This condition thus opens the short across the input to the noise detection and leveling circuit 78 and provides thereto a sample of the noise signal during the second gating pulses.

The sampled noise signal passing to the noise detection and leveling circuit 78 from noise gate 55 is first amplified by the noise amplifier 79 and applied to a noise detector 80 which provides a D.C. output voltage whose magnitude is an average of the sampled noise signal. The D.C. output voltage from the detector 80 is amplified by the noise D.C. amplifier 81 and then fed to a servo amplifier and motor arrangement 82 which senses changes in the D.C. voltage above a predetermined level, and reflects these changes in proportional rotational movement of the shaft of the motor portion of the arrangement 82 in one direction or the other. A mechanical connection indicated by broken line 83 serves to connect the shaft of the motor portion of the servo amplifier and motor arrangement 82 to the movable arm 45 of the potentiometer 43, and is so arranged as to move in accordance with shaft rotation to actuate the movable arm 45 to cancel out changes in the D.C. voltage above the predetermined level by varying the input to video amplifier 48. Thus, if the D.C. voltage increases above the predetermined level due to an increase in noise level in the output of receiver 15, the servo amplifier and motor arrangement 82 senses the increase and moves the movable arm 45 in proportion to the increase in a direction to eliminate the increase by reducing the input to the amplifier 48 thus maintaining the noise level input to the evaluator 46 at a constant or predetermined level. On the other hand, if there should be a decrease in the D.C. voltage above the predetermined level due to a decrease in receiver noise output level the movable arm 45 is proportionately moved in a direction to increase the input to the amplifier 48, to maintain the noise level at the predetermined value.

It can be readily seen from the above that since the noise leveling circuit 78 acts to maintain the noise signal level input to the evaluator 42 constant by varying the input to the evaluator in accordance with changes in the noise signal level above a predetermined value, that the amplitudes of the regulated pulses, which are found in the output of receiver 15, are also varied in accordance with these changes. That is, as the noise signal level in the receiver output increases, the amplitudes of the regulated pulses are decreased, and as the noise signal level decreases the amplitudes of the regulated pulses are increased, thus providing a continuous representation of changes in the maximum actual range capability of the radar system due to noise level changes in the output of receiver 15. As hereinbefore stated, since the signal gate 56 continuously samples the regulated pulses, the variations in amplitude of the regulated pulses caused by the action of the noise detection and leveling circuit 78 are reflected in the D.C. voltage found in the output of detector 73, which now not only represents the maximum actual range capability of the radar system due to changes in the gain of receiver 15, but also represents the maximum actual range capability due to changes in the noise level found in the output of the receiver.

In the present invention there is further provision of apparatus in the form of a sensing circuit 84 which is capable of continuously sensing variations in the energy level of the transmitted pulses produced by the transmitter 12 below a predetermined level to thus produce in its output a signal reflecting changes in the maximum actual range capability of the radar system due to changes in the transmitted power of the system. An arrangement 85 responds to the signal produced by the sensing circuit 84 and utilizes this signal to further vary the D.C. signal found in the output of the detector 73, and applied to the display circuit 74, in a manner to be hereinafter more fully described.

Figure 5:
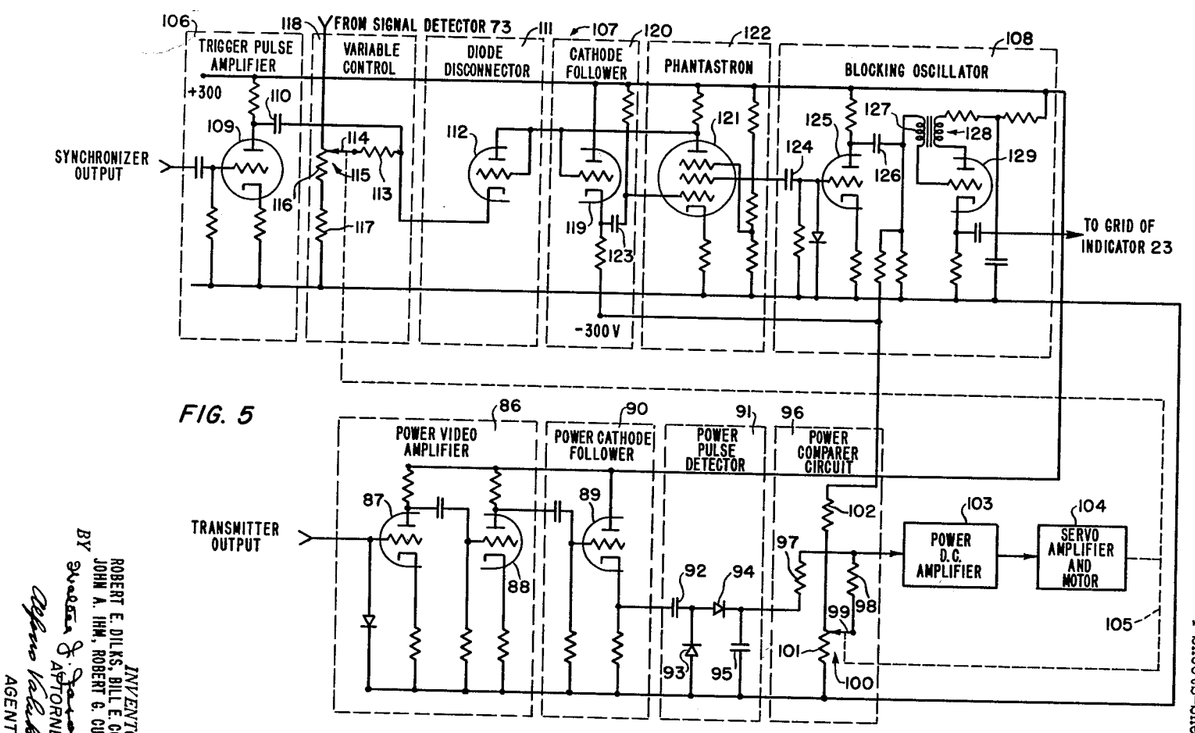
FIG. 5 is a schematic showing, partly in block diagram form, of certain other components of the evaluator of FIG. 3.

The sensing circuit 84 of FIG. 3, the details of which are best shown in FIG. 5, provides a means for determining changes in the power output level of the transmitter 12 below a predetermined level. The numeral 86 designates a power video amplifier having a pair of triode amplifier tubes 87 and 88, the grid of tube 87 being adapted to be connected to the coupler 41 which directs a portion of the transmitted energy thereto. The output of the tube 88 is further amplified by the tube 89 of power cathode follower 90 and then applied to a power pulse detector 91 consisting of capacitor 92, diodes 93 and 94, and capacitor 95 arranged to convert the transmitted energy to a D.C. voltage whose amplitude is proportional to the average transmitted energy. The D.C. voltage developed by the power pulse detector 91 is next applied to a comparer circuit 96 which continuously compares the D.C. voltage with a reference voltage to provide a differential D.C. voltage indicative of the changes in transmitter power level below a predetermined level. The power comparer circuit 96 consists of a resistor 97 having one end connected to the junction of diode 94 and capacitor 95. The other end of resistor 97 is connected to one end of a resistor 98 which has its other end connected to the movable arm 99 of potentiometer 100. One end of the resistor portion 101 of the potentiometer is connected to resistor 102 which is in turn connected to a negative reference voltage which represents the maximum attainable power output of the transmitter 12. The other end of resistor portion 101 is connected to ground. The output of the comparer circuit 96 is taken from the junction of resistors 97 and 98 and applied to a power D.C. amplifier 103 which amplifies the differential voltage detected by the comparer circuit 96 and applies it to a servo amplifier and motor arrangement 104, resulting in rotational movement of the shaft of the motor portion of the arrangement in proportion to the level of the differential voltage and in a direction determined by the polarity of the voltage. A mechanical connection indicated by broken line 105 serves to connect the shaft of the motor portion of the arrangement 104 with the movable arm 99 of the potentiometer 100 and is so arranged as to actuate the movable arm to eliminate the differential voltage. As will hereinafter be more fully described in the description of the display circuit 74, the mechanical connection 105 is also connected to a variable control device in the display circuit for further varying the D.C. voltage from the detector 73 to reflect changes in the maximum actual range of the radar system due to changes in the energy level of the transmitted pulses.

The display signal generating circuit 74 of FIG. 3, hereinbefore mentioned, consists of a trigger pulse amplifier 106 adapted to be connected to the synchronizer 13 for producing in its output negative trigger pulses in response to the positive trigger pulses generated by the synchronizer. The negative trigger pulses thus produced are utilized to actuate a phantastron delay circuit 107 which is capable of generating delay pulses having leading edges time coincident with the leading edges of the negative trigger pulses and durations proportional to the maximum actual range capability of the radar system. A conventional blocking oscillator 108 is adapted to be triggered by the trailing edges of the delay pulses produced by the phantastron delay circuit 107 and produces in its output a series of pulses having their leading edges time coincident with the trailing edges of the delay pulses and which are adapted to actuate the grid 27 of cathode ray tube 23 to produce thereon the visual ring, as shown which represents the maximum actual range of the radar system.

Referring to FIG. 5 wherein the details of the display signal generating circuit 74 are illustrated in detail, the trigger pulse amplifier 106 is shown as having a tube 109 whose grid is adapted to be connected to the synchronizer 13. The plate of tube 109 is connected through a capacitor 110 to the cathode of a diode disconnector 111 which consists of a triode tube 112 having its grid and plate interconnected. The plate of tube 112 is connected both to the grid of a tube 119 constituting a cathode follower 120, and the plate of a tube 121 of a phantastron arrangement 122. A capacitor 123 connects the cathode of tube 119 to the control grid of tube 121. The diode disconnector 111, the cathode follower 120, and the phantastron 122, which constitute a part of the phantastron delay circuit 107, operate in a conventional manner and are believed to require no further explanation except to indicate that when negative pulses produced by the trigger pulse amplifier 106 are applied to the cathode of diode disconnector 111, there is produced in the output of the phantastron 122, a series of pulses having leading edges time coincident with the leading edges of the negative trigger pulses, and durations determined by the voltage on the plate of tube 121.

A variable control device 118 is utilized in the present invention to provide a voltage indicative of the maximum actual range capability of the radar system on the plate of the tube 121 to determine the durations of the pulses produced by the portion of the phantastron delay circuit 107 including the diode disconnector 111, the cathode follower 120, and the phantastron 122. The control device 118 consists of a resistor 113 having one end connected to the plate of tube 109 and the other end connected to the movable arm 114 of a potentiometer 15.

The resistor portion 116 of the potentiometer has one end connected to the signal detector 73, and the other end to a resistor 117 whose other end is connected to ground. The movable arm 114 is mechanically connected to the servo amplifier and motor 104 by means of the mechanical connection 105 for movement therewith such that as the power level of the transmitted pulses decreases, the movable arm 114 is moved in a direction to decrease the voltage picked off by the movable arm, and when the power increases, the movable arm is moved in the opposite direction to pick off a proportionately increased voltage.

In summation since the D.C. voltage picked off by the movable arm 114 represents the maximum actual range capability of the radar system due to changes in receiver gain, receiver noise, and transmitter power from optimum levels, the durations of the pulses generated by the phantastron delay circuit are equally representative of the maximum actual range of the system, since the D.C. voltage appearing on the movable arm 114 is utilized as a control voltage to directly regulate the durations of the pulses.

The pulses produced by the phantastron delay circuit 107 are taken from the screen grid of tube 121 and applied through a capacitor 124 to the grid of amplifier tube 125 of a conventional blocking oscillator circuit 108. A capacitor 126 couples the plate of tube 125 through the primary winding 127 of a transformer 128 to the grid of tube 129. The output of tube 129 is taken from its cathode and contains pulses having leading edges time coincident with the trailing edges of the pulses from the phantastron delay circuit 107 and which are utilized to actuate the grid 27 of indicator 23 and produce the visual ring, as shown, which represents the maximum actual range of the radar system.

Although a specific embodiment of the present invention has been described and illustrated in detail, it is to be understood that the invention is not limited thereto as many variations will be readily apparent to those skilled in the art and the invention is to be given its broadest possible interpretation within the terms of the following claims.

What we claim is:

1. A radar performance monitor for a radar system having transmitter means for generating transmitted pulses of radio frequency energy, receiver means for detecting echo signals reflected by objects in the path of said transmitted pulses and indicator means for visually displaying said objects, said monitor comprising signal generator means for producing a signal indicative of the maximum attainable range capability of said radar system in said receiver means while said radar system is operating, means connected to said receiver means and responsive to changes in noise signal magnitude above a predetermined level in the output of said receiver means for inversely varying the magnitude of said signal appearing in the output of said receiver means in accordance with said changes to reflect maximum actual range capability of said radar system due to noise in said system, means connected to said transmitter means responsive to variations in the power magnitude of said transmitted pulses below a predetermined level for directly varying the magnitude of said signal appearing in the output of said receiver means in accordance with said variations to reflect maximum actual range capability due to power changes of said transmitter means, and means for displaying said varied signal on said indicator means to provide thereon a continuous visual display of the maximum actual range capability of said radar system while said system is in operation.

2. A radar performance monitor for a radar system having transmitter means for generating transmitted pulses of radio frequency energy, receiver means for detecting echo signals reflected by objects in the path of said transmitted pulses, indicator means for visually displaying said objects, and synchronizer means for supplying synchronizing trigger pulses for said system, said monitor comprising means responsive to said synchronizing trigger pulses for producing delay pulses having trailing edges so delayed in time as to represent the leading edges of echo pulses which would be reflected by an object located at the maximum attainable range of said radar system, means responsive to said delay pulses for providing simulated echo pulses having energy of the same frequency as said transmitted pulses and duration and magnitudes equal to the durations and magnitudes of said echo pulses, said simulated echo pulses being inserted in the input of said receiver means while said system is operating, means responsive to changes in noise signal magnitude above a predetermined level in the output of said receiver means for inversely varying the magnitudes of said simulated echo pulses appearing in the output of said receiver means in accordance with said changes to reflect maximum actual range capability of said radar system due to noise in said system, means responsive to variations in the power magnitude of said transmitted pulses below a predetermined level for directly varying the magnitudes of said simulated echo pulses appearing in the output of said receiver means in accordance with said variations to reflect maximum actual range capability due to power changes of said transmitter means, and means for displaying said varied simulated echo pulses on said indicator means to provide thereon a continuous visual display of the maximum actual range capability of said radar system while said system is in operation.

3. A radar performance monitor for a radar system having transmitter means for generating transmitted pulses of radio frequency energy, receiver means for detecting echo signals reflected by objects in the path of said transmitted pulses, indicator means for visually displaying said objects, and synchronizer means for supplying synchronizing trigger pulses for said system, said monitor comprising means responsive to said synchronizing trigger pulses for producing delay pulses having trailing edges so delayed in time as to represent the leading edges of echo pulses which would be reflected by an object located at the maximum attainable range of said radar system, means responsive to said delay pulses for providing delayed trigger pulses having leading edges time coincident with the trailing edges of said delay pulses, means responsive to said delayed trigger pulses for generating simulated echo pulses having energy of the same frequency as the energy contained in said transmitted pulses, said simulated echo pulses having leading edges time coincident with the leading edges of said delayed trigger pulses and durations and magnitudes equal to the durations and magnitudes of said echo pulses, said simulated echo pulses being inserted in the input of said receiver means while said system is operating, means responsive to changes in noise signal magnitude above a predetermined level in the output of said receiver means for inversely varying the magnitudes of said simulated echo pulses appearing in the output of said receiver means in accordance with said changes to reflect maximum actual range capability of said radar system due to noise in said system, means responsive to variations in the power magnitude of said transmitted pulses below a predetermined level for directly varying the magnitudes of said simulated echo pulses appearing in the output of said receiver means in accordance with said variations to reflect maximum actual range capability due to power changes of said transmitter means, and means for displaying said varied simulated echo pulses on said indicator means to provide thereon a continuous visual display of the maximum actual range capability of said radar system while said system is in operation.

4. A radar performance monitor for a radar system having transmitter means for generating transmitted pulses of radio frequency energy, receiver means for detecting echo signals reflected by objects in the path of said transmitted pulses, indicator means for visually displaying said objects, and synchronizer means for supplying synchronizing trigger pulses for said system, said monitor comprising means responsive to said synchronizing trigger pulses for producing first delay pulses having trailing edges so delayed in time as to represent the leading edges of echo pulses which would be reflected by an object located at the maximum attainable range of said radar system, means responsive to said first delay pulses for providing delayed trigger pulses having leading edges time coincident with the trailing edges of said first delay pulses, means responsive to said delayed trigger pulses for producing second delay pulses having leading edges time coincident with the leading edges of said delayed trigger pulses and durations equal to the durations of said echo pulses, said second delay pulses being provided with energy having the same frequency as the energy contained in said transmitted pulses and having magnitudes equal to the magnitudes of said echo pulses, said second delay pulses being inserted in the input of said receiver means while said system is operating, means responsive to changes in noise signal magnitude above a predetermined level in the output of said receiver means for inversely varying the magnitudes of said second delay pulses appearing in the output of said receiver means in accordance with said changes to reflect maximum actual range capability of said radar system due to noise in said system, means responsive to variations in the power magnitude of said transmitted pulses below a predetermined level for directly varying the magnitudes of said second delay pulses appearing in the output of said receiver means in accordance with said variations to reflect maximum actual range capability due to power changes of said trainsmitter means, and means for displaying said varied second delay pulses on said indicator means to provide thereon a continuous visual display of the maximum range capability of said radar system while said system is in operation.

5. A radar performance monitor for a radar system having transmitter means for generating transmitted pulses of radio frequency energy, receiver means for detecting echo signals reflected by objects in the path of said transmitted pulses, indicator means for visually displaying said objects, and synchronizer means for supplying synchronizing trigger pulses for said system, said monitor comprising means responsive to said synchronizing trigger pulses for producing first delay pulses having trailing edges so delayed in time as to represent the leading edges of echo pulses which would be reflected by an object located at the maximum attainable range of said radar system, means responsive to said first delay pulses for providing delayed trigger pulses having leading edges time coincident with the trailing edges of said first delay pulses, means responsive to said delayed trigger pulses for producing second delay pulses having leading edges time coincident with the leading edges of said delayed trigger pulses and durations equal to the durations of said echo pulses, means for supplying said second delay pulses with energy having the same frequency as the energy contained in said transmitted pulses, means for adjusting the magnitudes of said second delay pulses equal to the magnitudes of said echo pulses which would be reflected from said object having a predetermined size and located at said maximum attainable range, said adjusted second delay pulses being inserted in the input of said receiver means while said system is operating, means responsive to changes in noise signal magnitude above a predetermined level in the output of said receiver means for inversely varying the magnitudes of said second delay pulses appearing in the output of said receiver means in accordance with said changes to reflect maximum actual range capability of said radar system due to noise in said system, means responsive to variations in the power magnitude of said transmitted pulses below a predetermined level for directly varying the magnitudes of said second delay pulses appearing in the output of said receiver means in accordance with said variations to reflect maximum actual range capability due to power changes of said transmitter means, and means for displaying said varied second delay pulses on said indicator means to provide thereon a continuous visual display of the maximum range capability of said radar system while said system is in operation.

6. A radar performance monitor for a radar system having transmitter means for generating transmitted pulses of radio frequency energy, receiver means for detecting echo signals reflected by objects in the path of said transmitted pulses, and indicator means for visually displaying said objects, said monitor comprising signal generator means for producing a signal representative of the maximum attainable range capability of said radar system in the input of said receiver means while said system is operating, variable gain control means adapted to be connected to the output means of said receiver means, signal sampling means connected to said variable gain control means for sampling said signal and any noise signals appearing in the output of said receiver means, means connected to said signal sampling means and responsive to changes in said noise signals above a predetermined level for varying said variable gain control means in accordance with said changes to maintain said predetermined level, detector means connected to said signal sampling means and responsive to said sampled signal for providing a detected signal indicative of the level of said sampled signal, pulse generator means for generating pulses having leading edges time coincident with the leading edges of said transmitted pulses and having durations proportional to the level of said detected signal, said pulse generator means comprising second variable gain control means connected to said detector means for regulating the level of said detected signal to control the duration of said pulses, means connected to said transmitter means and responsive to variations in the energy level of said transmitted pulses below a predetermined level for varying said second variable gain control means in accordance with said variations to regulate the level of said detected signal, display pulse generator means connected to said pulse generator means and responsive to said pulses for generating display pulses having leading edges time coincident with the trailing edges of said pulses, said display pulses actuating said indicator means to provide thereon a visual indication of the maximum actual range capability of said system.

7. A radar performance monitor for a radar system having transmitter means for generating transmitted pulses of radio frequency energy, receiver means for detecting echo signals reflected by objects in the path of said transmitted pulses, and indicator means for visually displaying said objects, said monitor comprising signal generator means for producing a signal representative of the maximum attainable range capability of said radar system in the input of said receiver means while said system is operating, potentiometer means having a fixed resistor portion connected across the output means of said receiver means, and a variable arm portion, signal sampling means connected to said variable arm portion for sampling said signal and any noise signals appearing in the output of said receiver means, means connected to said signal sampling means and responsive to changes in said noise signals above a predetermined level for moving said movable arm portion in accordance with said changes to maintain said predetermined level, detector means connected to said signal sampling means and responsive to said sampled signal for providing a detected signal indicative of the level of said sampled signal, pulse generator means for generating pulses having leading edges time coincident with the leading edges of said transmitted pulses and having durations proportional to the level of said detected signal, said pulse generator means comprising variable gain control means connected to said detector means for regulating the level of said detected signal to control the durations of said pulses, means connected to said transmitter means and responsive to variations in the energy level of said tranmsitted pulses below a predetermined level for varying said variable gain control means in accordance with said variations to regulate the level of said detected signal, display pulse generator means connected to said pulse generator means and responsive to said pulses for generating display pulses having leading edges time coincident with the trailing edges of said pulses, said display pulses adapting said indicator means to provide thereon a visual indication of the maximum actual range capability of said system.

8. A radar performance monitor for a radar system having transmitter means for generating transmitted pulses of radio frequency energy, receiver means for detecting echo signals reflected by objects in the path of said transmitted pulses, indicator means for visually displaying said objects, and synchronizer means for supplying synchronizing trigger pulses for said system, said monitor comprising means responsive to said synchronizing trigger pulses for producing delay pulses having trailing edges so delayed in time as to represent the leading edges of echo pulses which would be reflected by an object located at the maximum attainable range of said radar system, means responsive to said delay pulses for providing delayed trigger pulses having leading edges time coincident with the trailing edges of said delay pulses, means responsive to said delayed trigger pulses for generating simulated echo pulses having energy of the same frequency as the energy contained in said transmitted pulses, said simulated echo pulses having leading edges time coincident with the leading edges of said delayed trigger pulses and durations and magnitudes equal to the durations and magnitudes of said echo pulses, said simulated echo pulses being adapted to be inserted in the input of said receiver means while said system is operating, variable gain control means connected to the output means of said receiver means, means responsive to said delayed trigger pulses for providing first gating pulses having leading edges time coincident with the leading edges of said delayed trigger pulses and durations equal to the durations of said simulated echo pulses, means connected to said variable gain control means and responsive to said first gating pulses for sampling said simulated echo pulses appearing in the output of said receiver means during said first gating pulses, means responsive to said first gating pulses for providing second gating pulses having leading edges time coincident with the trailing edges of said first gating pulses and trailing edges delayed in time with respect to the leading edges of said transmitted pulses, means connected to said variable gain control means and responsive to said second gating pulses for sampling any noise signals appearing in the output of said receiver means during said second gating pulses, means connected to said noise signal sampling means and responsive to changes in said noise signals above a predetermined level for varying said variable gain control means in accordance with said changes to maintain said predetermined level, detector means connected to said simulated echo pulse sampling means and responsive to said simulated echo pulses for providing a detected signal indicative of the level of said simulated echo pulses, pulse generator means for generating pulses having leading edges time coincident with the leading edges of said transmitted pulses and having durations proportional to the level of said detected signal, said pulse generator means comprising second variable gain control means connected to said detector means for regulating the level of said detected signal to control the durations of said pulses, means connected to said transmitter means and responsive to variations in the energy level of said transmitted pulses below a predetermined level for varying said second variable gain control means in accordance with said variations to regulate the level of said detected signal, display pulse generator means connected to said pulse generator means and responsive to said pulses for generating display pulses having leading edges time coincident with the trailing edges of said pulses, said display pulses actuating said indicator means to provide thereon a visual indication of the maximum actual range of said system.

9. A radar performance monitor for a radar system having transmitter means for generating transmitted pulses of radio frequency energy, receiver means for detecting echo signals reflected by objects in the path of said transmitted pulses, and indicator means for visually displaying said objects, said monitor comprising signal generator means for producing a signal representative of the maximum attainable range capability of said radar system in the input of said receiver means while said system is operating, variable gain control means connected to the output means of said receiver means, signal sampling means connected to said variable gain control means for sampling said signal and any noise signals appearing in the output of said receiver means, noise detector means connected to said signal sampling means and responsive to said sampled noise signals for providing a first D.C. signal indicative of the level of said sampled noise signals, means connected to said noise detector means and responsive to said first D.C. signal above a predetermined level for varying said variable gain control means in accordance with said changes to maintain said predetermined level, signal detector means connected to said signal sampling means and responsive to said signal for providing a second D.C. signal indicative of the level of said sampled signal, pulse generator means for generating pulses having leading edges time coincident with the leading edges of said transmitted pulses and having durations proportional to the level of said second D.C. signal, said pulse generator means comprising second variable gain control means for controlling the level of said second D.C. signal to control the durations of said pulses, means adapted to be connected to said transmitter means and responsive to variations in the energy level of said transmitted pulses below a predetermined level for varying said second variable gain control means in accordance with said variations to regulate the level of said second D.C. signal, display pulse generator means connected to said pulse generator means and responsive to said pulses for generating display pulses having leading edges time coincident with the trailing edges of said pulses, said display pulses actuating said indicator means to provide thereon a visual indication of the maximum actual range capability of said system.

10. A radar performance monitor for a radar system having transmitter means for generating transmitted pulses of radio frequency energy, receiver means for detecting echo signals reflected by objects in the path of said transmitted pulses, and indicator means for visually displaying said objects, said monitor comprising signal generator means for producing a signal representative of the maximum attainable range capability of said radar system in the input of said receiver means while said system is operating, variable gain control means connected to the output of said receiver means, signal sampling means connected to said variable gain control means for sampling said signals and any noise signals appearing in the output of said receiver means, noise detector means connected to said signal sampling means and responsive to said sampled noise signals for providing a first D.C. signal indicative of the level of said sampled noise signals, means connected to said noise detector means and responsive to changes in said first D.C. signal above a predetermined level for varying said variable gain control means in accordance with said changes to maintain said predetermined level, signal detector means connected to said signal sampling means and responsive to said signal for providing a second D.C. signal indicative of the level of said sampled signal, pulse generator means for generating pulses having leading edges time coincident with the leading edges of said transmitted pulses and having durations proportional to the level of said second D.C. signal, said pulse generator means comprising second variable gain control means for controlling the level of said second D.C. signal to regulate the durations of said pulses, power detector means connected to said transmitter means and responsive to said transmitted pulses for providing a third D.C. signal indicative of the power level of said transmitted pulses, means connected to said power detector means and responsive to variations in said third D.C. signal below a predetermined level for varying said second variable gain control means in accordance with said variations to control the level of said second D.C. signal, display pulse generator means connected to said pulse generator means and responsive to said pulses for generating display pulses having leading edges time coincident with the trailing edges of said pulses, said display pulses actuating said indicator means to provide thereon a visual indication of the maximum actual range capability of said system.

11. A radar performance monitor for a radar system having transmitter means for generating transmitted pulses of radio frequency energy, receiver means for detecting echo signals reflected by objects in the path of said transmitted pulses, and indicator means for visually displaying said objects, said monitor comprising signal generator means for producing a signal representative of the maximum attainable range capability of said radar system in the input of said receiver means while said system is operating, variable gain control means connected to the output means of said receiver means, signal sampling means connected to said variable gain control means for sampling said signal and any noise signals appearing in the output of said receiver means, means connected to said signal sampling means and responsive to changes in said noise signals above a predetermined level for varying said variable gain control means in accordance with said changes to maintain said predetermined level, detector means connected to said signal sampling means and responsive to said sampled signal for providing a detected signal indicative of the level of said sampled signal, pulse generator means for generating pulses having leading edges time coincident with the leading edges of said transmitted pulses and having durations proportional to the level of said detected signal, said pulse generator means comprising potentiometer means having a resistor portion connected to said detector means and a movable arm portion for regulating the level of said detected signal to control the durations of said pulses, means connected to said transmitter means and responsive to variations in the energy level of said transmitted pulses below a predetermined level for varying said movable arm portion in accordance with said variations to regulate the level of said detected signal, display pulse generator means connected to said pulse generator means and responsive to said pulses for generating display pulses having leading edges time coincident with the trailing edges of said pulses, said display pulses actuating said indicator means to provide thereon a visual indication of the maximum actual range capability of said system.

12. A radar performance monitor for a radar system having transmitter means for generating transmitted pulses of radio frequency energy, receiver means for detecting echo signals reflected by objects in the path of said transmitted pulses, and indicator means for visually displaying said objects, said monitor comprising signal generator means for producing a signal representative of the maximum attainable range capability of said radar system in the input of said receiver means while said system is operating, variable gain control means connected to the output means of said receiver means, signal sampling means connected to said variable gain control means for sampling said signal and any noise signal appearing in the output of said receiver means, means connected to said signal sampling means and responsive to changes in said noise signals above a predetermined level for varying said variable gain control means in accordance with said changes to maintain said predetermined level first detector means connected to said signal sampling means and responsive to said sampled signal for providing a first detected signal indicative of the level of said sampled signal, pulse generator means for generating pulses having leading edges time coincident with the leading edges of said transmitted pulses and having durations proportional to the level of said first detected signal, said pulse generator means comprising second variable gain control means connected to said detector means for regulating the level of said first detected signal to control the durations of said pulses, second detector means connected to said transmitter means and responsive to said transmitted pulses for producing a second detected signal indicative of the power level of said transmitted pulses, comparer circuit means connected to said second detector means for comparing said second detected signal with a reference voltage indicative of the maximum attainable power level of said transmitter means to provide a difference signal, means responsive to said difference signal for varying said second variable gain control means in accordance with said difference signal to regulate the level of said second detected signal, display pulse generator means connected to said pulse generator means and responsive to said pulses for generating display pulses having leading edges time coincident with the trailing edges of said pulses, said display pulses actuating said indicator means to provide thereon a visual indication of the maximum actual range capability of said system.

References Cited in the file of this patent

UNITED STATES PATENTS 2,874,380     Fuller et al.            Feb. 17, 1959

FOREIGN PATENTS 658,686     Great Britain            Oct. 10, 1949